US009487931B2

(12) United States Patent
Atkinson et al.

(10) Patent No.: US 9,487,931 B2
(45) Date of Patent: Nov. 8, 2016

(54) EXCAVATION SYSTEM PROVIDING MACHINE CYCLE TRAINING

(71) Applicant: Caterpillar Inc., Peoria, IL (US)

(72) Inventors: David C. Atkinson, Dunlap, IL (US); Kenneth L. Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 5 days.

(21) Appl. No.: 14/485,088

(22) Filed: Sep. 12, 2014

(65) Prior Publication Data

US 2016/0076225 A1 Mar. 17, 2016

(51) Int. Cl.
| | |
|---|---|
| *G06F 7/70* | (2006.01) |
| *G06F 19/00* | (2011.01) |
| *E02F 9/20* | (2006.01) |
| *G07C 5/08* | (2006.01) |
| *E02F 3/43* | (2006.01) |

(Continued)

(52) U.S. Cl.
CPC .............. *E02F 9/2045* (2013.01); *E02F 3/432* (2013.01); *E02F 3/434* (2013.01); *E02F 9/262* (2013.01); *E02F 9/265* (2013.01); *G01S 17/00* (2013.01); *G07C 5/0841* (2013.01)

(58) Field of Classification Search
USPC ...... 701/41, 50, 485; 37/411–414, 417, 419, 37/348; 414/694, 697, 699, 701, 481, 560, 414/467, 474
See application file for complete search history.

(56) References Cited

U.S. PATENT DOCUMENTS

| | | | | |
|---|---|---|---|---|
| 2,755,939 A | * | 7/1956 | Rush | B66C 13/18 |
| | | | | 212/238 |
| 5,490,687 A | * | 2/1996 | Scholl | A61G 5/14 |
| | | | | 280/250.1 |

(Continued)

FOREIGN PATENT DOCUMENTS

| | | | | |
|---|---|---|---|---|
| AU | 2011235984 A1 | * | 5/2013 | E05C 5/18 |
| CA | 2775858 A1 | * | 4/2013 | E06C 5/00 |

(Continued)

OTHER PUBLICATIONS

Real-time Google Earth 3D assisted driving system in surface mining operations; Enji Sun; Nieto, A.; Zhongxue Li; Computer-Aided Industrial Design & Conceptual Design, 2009. CAID & CD 2009. IEEE 10th International Conference on; Year: 2009; pp. 2095-2099, DOI: 10.1109/CAIDCD.2009.5374858.*

(Continued)

*Primary Examiner* — Cuong H Nguyen
(74) *Attorney, Agent, or Firm* — Finnegan, Henderson, Farabow, Garrett & Dunner, LLP; L. Glenn Waterfield

(57) ABSTRACT

An excavation system is disclosed as having a locating device configured to generate a position signal indicative of a position of an excavation machine, a sensor configured to generate a load signal indicative of a work tool status, and a controller. The controller may be configured to determine a location of a haul truck, to determine when the work tool is filled with at least a threshold amount of material from a pile at the worksite, and to determine the position of the excavation machine. The controller may further be configured, based on operating limitations of the excavation machine, to determine a pivot point between the location of the haul truck and the position of the excavation machine; to plan a travel path for the excavation machine to the haul truck through the pivot point; and to direct an operator of the excavation machine to follow the travel path.

14 Claims, 2 Drawing Sheets

(51) Int. Cl.
*E02F 9/26* (2006.01)
*G01S 17/00* (2006.01)

(56) References Cited

U.S. PATENT DOCUMENTS

| | | | | |
|---|---|---|---|---|
| 5,706,144 | A * | 1/1998 | Brandin | B60R 1/07 307/10.1 |
| 6,363,632 | B1 * | 4/2002 | Stentz | E02F 3/437 37/348 |
| 7,295,227 | B1 | 11/2007 | Asahi et al. | |
| 7,496,411 | B2 * | 2/2009 | Nakamura | G06Q 30/02 345/418 |
| 7,496,441 | B2 * | 2/2009 | Brandt | E02F 3/3414 137/625.64 |
| 7,734,397 | B2 * | 6/2010 | Peterson | E02F 3/437 172/2 |
| 7,934,329 | B2 * | 5/2011 | Mintah | E02F 3/437 37/195 |
| 7,950,685 | B2 * | 5/2011 | Hagenbuch | B60P 3/062 280/423.1 |
| 8,185,290 | B2 * | 5/2012 | Mintah | E02F 3/435 172/3 |
| 8,332,106 | B2 * | 12/2012 | Yuet | B65H 75/425 701/50 |
| 8,793,055 | B2 * | 7/2014 | Eklund | E02F 9/26 701/1 |
| 8,858,151 | B2 * | 10/2014 | Atkinson | E02F 3/434 414/685 |
| 8,903,689 | B2 * | 12/2014 | Dunbabin | E02F 9/2029 703/6 |
| 9,051,717 | B2 * | 6/2015 | Hodges | E02F 3/352 |
| 2007/0150149 | A1 * | 6/2007 | Peterson | E02F 3/437 701/50 |
| 2008/0258896 | A1 | 10/2008 | Stoller et al. | |
| 2010/0171828 | A1 | 7/2010 | Ishii | |
| 2010/0198466 | A1 * | 8/2010 | Eklund | E02F 9/26 701/50 |
| 2013/0045071 | A1 * | 2/2013 | Atkinson | E02F 3/434 414/685 |
| 2013/0074645 | A1 * | 3/2013 | Hakansson | E02F 9/2004 74/523 |
| 2013/0084155 | A1 * | 4/2013 | Hodges | E02F 3/352 414/696 |
| 2013/0107047 | A1 | 5/2013 | Sherlock et al. | |
| 2013/0206547 | A1 * | 8/2013 | Lurie | B65G 65/04 198/540 |
| 2013/0325208 | A1 | 12/2013 | Osagawa et al. | |
| 2014/0019015 | A1 * | 1/2014 | Claxton | E02F 9/00 701/50 |
| 2014/0019042 | A1 | 1/2014 | Sugawara et al. | |
| 2014/0068824 | P1 | 3/2014 | Ishimoto | |
| 2014/0178164 | A1 * | 6/2014 | Peterson | E02F 3/432 414/685 |
| 2014/0224377 | A1 * | 8/2014 | Bonefas | A01D 43/073 141/1 |
| 2015/0033719 | A1 * | 2/2015 | Lawrence | E02F 3/435 60/327 |

FOREIGN PATENT DOCUMENTS

| | | | | |
|---|---|---|---|---|
| DE | 202008011069 | U1 * | 12/2010 | F02B 75/18 |
| JP | 06-083443 | A | 3/1994 | |
| JP | 08-263138 | A | 10/1996 | |
| JP | 2009107602 | | 11/2007 | |
| WO | WO 2016040289 | A1 * | 3/2016 | B65G 67/04 |

OTHER PUBLICATIONS

Map-building and map-based localization in an underground-mine by statistical pattern matching; Madhavan, R.; Dissanayake, G.; Durrant-Whyte, H.; Pattern Recognition, 1998. Proceedings. Fourteenth International Conference on; Year: 1998, vol. 2 pp. 1744-1746 vol. 2, DOI: 10.1109/ICPR.1998.712063.*

Unmanned loading operation by autonomous wheel loader; Koyachi, N.; Sarata, S.; ICCAS-SICE, 2009; Year: 2009; pp. 2221-2225; Referenced in: IEEE Conference Publications.*

Autonomous underground navigation of an LHD using a combined ICP-EKF approach; Madhavan, R.; Dissanayake, M.W.M.G.; Durrant-Whyte, H.F.; Robotics and Automation, 1998. Proceedings. 1998 IEEE International Conference on; Year: 1998, vol. 4; pp. 3703-3708 vol. 4, DOI: 10.1109/ROBOT.1998.681413.*

A robotic excavator for autonomous truck loading; Stentz, A.; Bares, J.E.; Singh, S.; Rowe, P.; Intelligent Robots and Systems, 1998. Proceedings., 1998 IEEE/RSJ International Conference on; Year: 1998, vol. 3; pp. 1885-1893 vol.3, DOI: 10.1109/IROS.1998.724871.*

Development of autonomous excavation technology for hydraulic excavators; Yamamoto, H.; Moteki, M.; Shao, H.; Ootuki, T. ICCAS-SICE, 2009; Year: 2009; pp. 2226-2229.*

Unmanned loading operation by autonomous wheel loader; Koyachi, N.; Sarata, S.; ICCAS-SICE, 2009; Year: 2009 pp. 2221-2225.*

Field test of autonomous loading operation by wheel loader; Sarata, S.; Koyachi, N.; Sugawara, K.; Intelligent Robots and Systems, 2008. IROS 2008. IEEE/RSJ International Conference on; Year: 2008; pp. 2661-2666, DOI: 10.1109/IROS.2008.4650638.*

A robotic excavator for autonomous truck loading; A. Stentz; J. Bares; S. Singh; P. Rowe; Intelligent Robots and Systems, 1998. Proceedings., 1998 IEEE/RSJ International Conference on; Year: 1998, vol. 3; pp. 1885-1893 vol. 3, DOI:10.1109/IROS.1998.724871.*

A linear relaxation solution of the Tactical Movement Problem; P. Beasley; P. R. McAree; Intelligent Robots and Systems (IROS), 2012 IEEE/RSJ International Conference on; Year: 2012; pp. 672-677, DOI:10.1109/IROS.2012.6385760.*

Development of autonomous excavation technology for hydraulic excavators; H. Yamamoto; M. Moteki; H. Shao; T. Ootuki, ICCAS-SICE, 2009; Year: 2009; pp. 2226-2229.*

Structural Design and Performance Analysis of a Lengthened Working Device of Hydraulic Excavator Based on General Hydraulic Cylinder; J. Liu; S. Kuang; J. Chen; X. Zhang; L. Xia; Information Technology and Applications (ITA), 2013 International Conference on; Year: 2013; pp. 354-357, DOI:10.1109/ITA.2013.87.*

* cited by examiner

EXCAVATION SYSTEM PROVIDING MACHINE CYCLE TRAINING

TECHNICAL FIELD

The present disclosure is directed to an excavation system and, more particularly, to an excavation system providing machine cycle training.

BACKGROUND

Excavation machines, such as wheel loaders, are used to load earthen material onto a haul truck for transportation away from a worksite. Some wheel loaders are articulated and also have steerable wheels, which can make efficient maneuvering of the machines difficult for a novice operator. In order to be profitable, the operator must move as much material as possible within a given period of time. Further, in order to reduce operating costs, the operator should control the machine to use as little fuel as possible and to reduce wear of the machine (e.g., to reduce tread wear of the machine's tires). During a typical truck loading cycle, the operator must fill a machine's bucket with material from a pile, back away from the pile while turning, reverse direction, and travel toward a waiting haul truck again while turning and also while lifting the bucket. The operator must then empty the bucket into the haul truck, back away from the haul truck while turning, reverse direction again, and travel towards the pile while turning and also while lowering the bucket. This can be difficult to do properly, especially if the operator is unskilled or inexperienced.

One attempt to improve excavation machine control is disclosed in U.S. Pat. No. 6,363,632 of Stentz et al. that issued on Apr. 2, 2002 ("the '632 patent"). Specifically, the '632 patent discloses an autonomous excavation system for use with a wheel loader. The system includes a left sensor, a right sensor, and a control module. Information from the two sensors is used by the control module to autonomously navigate the wheel loader during operation thereof. In addition, the sensors monitor the wheel loader's bucket to determine a loading status, as well as an area adjacent the bucket as the wheel loader backs away from or moves toward a soil face.

For example, as the wheel loader backs away, each sensor provides information concerning areas to the left and right of the wheel loader so that adequate response time is provided if an object obstructs the path of the wheel loader. Once the wheel loader reaches a pivot point, it reverses direction and stops as the bucket is raised to full height. During this period, information from the sensors is used to construct a range map of the soil face for use in planning the next excavation. After the bucket is fully raised, the sensors scan either side of the wheel loader as the wheel loader moves toward a dump truck. Information from the sensors is then used to monitor a clearance between the wheel loader and a bed of the dump truck. Once the bucket is unloaded, the sensors are again used to scan behind the wheel loader as it backs up to the pivot point, and the sensors continue to scan the area in front of the wheel loader as it approaches the soil face.

Additionally, upon arrival of the dump truck, the sensors are used to scan the dump truck, which provides information used by the control module to determine the location and orientation of the dump truck. As the material is moved from the soil face into the dump truck, the bucket of the wheel loader changes position and orientation. In addition, the dump trucks may vary in size, precise position, and orientation relative to the wheel loader. All such changes are taken into account to maximize efficiency in transferring the material with minimal spillage.

Although the system of the '632 patent may reduce operator burden by automating machine control, the system may still be less than optimal. In particular, the machine movements may not be optimally controlled to improve productivity, reduce fuel consumption, or reduce machine wear under varying worksite conditions. Further, the system of the '632 patent may be complex and expensive, and lack broad applicability to manned machines.

The disclosed excavation system is directed to overcoming one or more of the problems set forth above and/or other problems of the prior art.

SUMMARY

One aspect of the present disclosure is directed to an excavation system for use at a worksite having a haul truck and an excavation machine with a work tool. The excavation system may include a locating device configured to generate a position signal indicative of a position of the excavation machine, a sensor configured to generate a load signal indicative of a status of the work tool, and a controller in communication with the locating device and the sensor. The controller may be configured to determine a location of the haul truck; determine, based on the load signal, when the work tool of the excavation machine is filled with at least a threshold amount of material from a pile at the worksite; and, in response to the work tool being filled with at least the threshold amount of material, determine the position of the excavation machine based on the position signal. The controller may further be configured, based on operating limitations of the excavation machine, to determine a pivot point between the location of the haul truck and the position of the excavation machine at the time the work tool is filled with at least the threshold amount of material; to plan a travel path for the excavation machine to the haul truck through the pivot point; and to direct an operator of the excavation machine to follow the travel path.

Another aspect of the present disclosure is directed to a method of controlling an excavation machine at a worksite. The method may include determining a location of a haul truck, and determining when a work tool of the excavation machine is filled with at least a threshold amount of material from a pile at the worksite. The method may also include determining a position of the excavation machine in response to the work tool being filled with at least the threshold amount of material, and based on operating limitations of the excavation machine, determining a pivot point between the location of the haul truck and the position of the excavation machine at the time the work tool is filled with at least the threshold amount of material. The method may further include planning a travel path for the excavation machine to the haul truck through the pivot point, and directing an operator of the excavation machine to follow the travel path.

Another aspect of the present disclosure is directed to an excavation machine. The excavation machine may include a frame, a plurality of wheels rotatably connected to the frame and configured to support the frame, and a powertrain mounted to the frame and configured to drive the plurality of wheels. The excavation machine may also include a work tool, at least one hydraulic actuator connected between the work tool and the frame, and a locating device configured to generate a position signal indicative of a position of the excavation machine. The excavation machine may further include a sensor configured to generate a load signal indicative of a status of the work tool, a backup camera configured to generate images of an area behind the excavation machine, an operator station connected to the frame, a display located inside the operator station, and a controller in communication with the locating device, the sensor, the backup camera, and the display. The controller may be configured to receive a location signal from offboard the excavation machine that is indicative of a location of a haul truck; and to determine, based on the load signal, when the work tool of the excavation machine is filled with at least a threshold amount of material from a pile at the worksite. The controller may also be configured to determine the position of the excavation machine based on the position signal, in response to the work tool being filled with at least the threshold amount of material. The controller may additionally be configured to determine a pivot point between the location of the haul truck and the position of the excavation machine at a time the work tool is filled with at least the threshold amount of material, based on a time required for the at least one hydraulic actuator to lift the work tool to a height above the waiting haul truck and based on a distance that can be traveled by the excavation machine within that time. The controller may also be configured to plan a travel path for the excavation machine to the haul truck through the pivot point, and to show the travel path on the display overlapped with the images generated by the backup camera.

DETAILED DESCRIPTION

Figure 1:
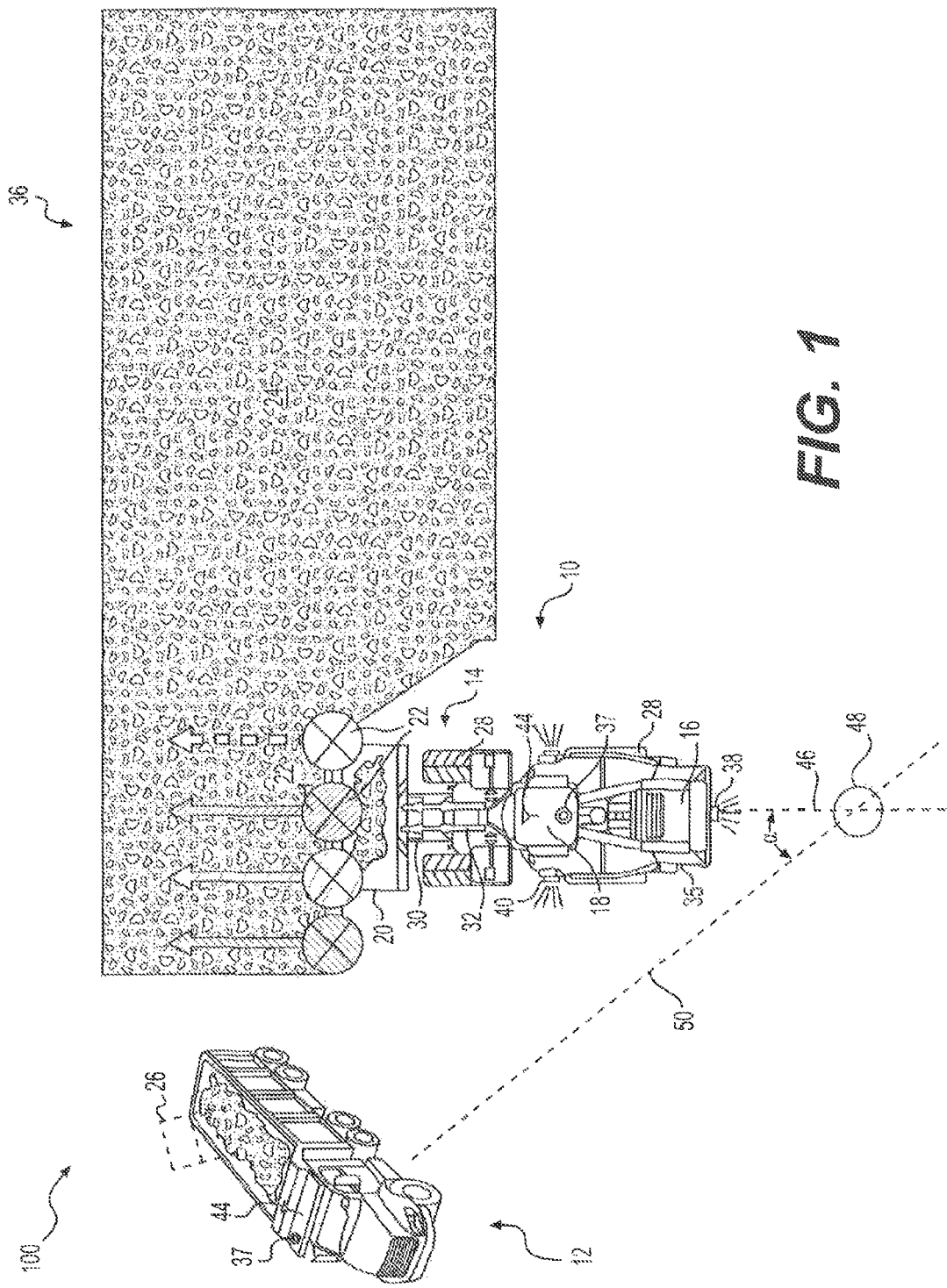
FIG. 1 is a diagrammatic illustration of an exemplary disclosed excavation machine operating at a worksite.

FIG. 1 illustrates an exemplary excavation machine 10 having multiple systems and components that cooperate to excavate and load earthen material onto a nearby haul truck 12. In the disclosed example, excavation machine 10 is a wheel loader (e.g., an articulated wheel loader). It is contemplated, however, that excavation machine 10 may embody another type of excavation machine, if desired.

Excavation machine 10 may include, among other things, an implement system 14, a powertrain 16, and an operator station 18 for manual control of implement system 14 and powertrain 16. Implement system 14 may be driven by powertrain 16 to repetitively move a work tool 20 between a dig location 22 at a pile 24 and a dump location 26 over haul truck 12 during completion of a particular excavation cycle (e.g., during a truck loading cycle). It is contemplated, however, that implement system 14 may be configured to move work tool 20 in another manner during a different excavation cycle, if desired. Powertrain 16, in addition to driving implement system 14, may also function to propel machine 10, for example via one or more traction devices (e.g., wheels) 28.

As shown in FIG. 1, the disclosed implement system 14 includes a linkage structure 30 that cooperates with one or more hydraulic actuators 32 to move work tool 20. Linkage structure 30 may be pivotally connected at a first end to a frame 35 of excavation machine 10, and pivotally connected at a second end to work tool 20. In the disclosed embodiment, hydraulic actuators 32 include a single lift cylinder (not shown) and a pair of tilt cylinders connected between work tool 20, linkage structure 30, and/or frame 35 to raise, lower, dump, and rack work tool 20. It is contemplated, however, that a greater or lesser number of hydraulic actuators 32 may be included within implement system 14 and/or connected in a manner other than described above, if desired.

Powertrain 16 may be supported by frame 35, and include an engine configured to produce a rotational power output and a transmission that converts the power output to a desired ratio of speed and torque. The rotational power output may be used to drive a pump that supplies pressurized fluid to hydraulic actuators 32 and/or to one or more motors (not shown) associated with traction devices 28. The engine of powertrain 16 may be a combustion engine configured to burn a mixture of fuel and air, the amount and/or composition of which directly corresponding to the rotational power output. The transmission of powertrain 16 may take any form known in the art, for example a power shift configuration that provides multiple discrete operating ranges, a continuously variable configuration, or a hybrid configuration.

Operator station 18 may be connected to frame 35, and configured to display information to an operator of excavation machine 10 and/or to receive input from the operator indicative of desired machine operations. Specifically, operator station 18 may include one or more operator interface devices 34 (shown only in FIG. 2) located proximate an operator seat (not shown). Interface devices 34 may be embodied as displays, joysticks, pedals, switches, wheels, knobs, and/or any other device known in the art. Interface devices 34 may be configured to communicate and/or generate signals that are used to control machine 10 (e.g., to control steering, travel speed, travel direction, work tool motion, etc.).

Numerous different work tools 20 may be attachable to a single machine 10 and controllable via operator station 18. Work tool 20 may include any device used to perform a particular task such as, for example, a bucket, a fork arrangement, a blade, a shovel, or any other task-performing device known in the art. Although connected in the embodiment of FIG. 1 to lift and tilt relative to machine 10, work tool 20 may alternatively or additionally rotate, slide, swing open/close, or move in any other manner known in the art.

FIG. 1 illustrates machine 10 performing a typical truck loading cycle at a worksite 36. Worksite 36 may include, for example, a mine site, a landfill, a quarry, a construction site, a road worksite, or any other type of worksite. The truck loading cycle may require machine 10 to generally traverse worksite 36 between dynamically changing dig locations 22 at pile 24 and dynamically changing dump locations 26 over haul truck 12. As machine 10 travels about worksite 36, a Global Navigation Satellite System (GNSS—not shown) or other tracking device or system may communicate with an onboard locating device 37 to monitor the movement of machine 10 at worksite 36. In some embodiments, haul truck 12 may be equipped with a similar locating device 37.

In one embodiment, excavation machine 10 may also be equipped with a camera, for example a backup camera 38. Backup camera 38 may be configured to generate images of worksite 36 at a location behind excavation machine 10. These images may then be transmitted to interface device 34 for display inside operator station 18. The operator may use these images when traveling in a reverse direction to help guide the operator.

Machine 10 may also include one or more externally mounted sensors 40. Each sensor 40 may be a device that detects and ranges objects, for example a LIDAR (light detection and ranging) device, a RADAR (radio detection and ranging) device, a SONAR (sound navigation and ranging) device, a camera device, or another device known in the art. In one example, sensor 40 may include an emitter that emits a detection beam to a particular zone within a detection range around machine 10, and an associated receiver that receives a reflection of that detection beam. Based on characteristics of the reflected beam, a distance and a direction from an actual sensing location of sensor 40 on machine 10 to a portion of the sensed object (e.g., to haul truck 12) within the particular zone may be determined. Sensor 40 may then generate a signal corresponding to the distance, direction, size, and/or shape of the object, and communicate the signal to an onboard controller 42 (shown only in FIG. 2) for subsequent conditioning and/or presentation within operator station 18.

Alternatively or additionally, excavation machine 10 may be outfitted with a communication device 44 that allows communication between excavation machine 10 and an offboard entity. For example, excavation machine 10 may communicate with haul truck 12 and/or a central facility (not shown) at worksite 36 via communication device 44. This communication may include, among other things, the location of haul truck 12. In particular, haul truck 12 may be configured to determine its own location and communicate that location to excavation machine 10 via communication devices 44. When the location of haul truck 12 is provided to excavation machine 10, it may be possible to omit sensor 40 if desired.

In yet another embodiment, excavation machine 10 (i.e., controller 42 onboard excavation machine 10) may instead communicate a desired loading location to haul truck 12 via communication devices 44. After communicating the desired loading location to haul truck 12, controller 42 may assume, for purposes of completing the truck loading cycle, that the current location of haul truck 12 is about the same as the desired loading location.

The desired loading location may be selected to provide a cycle time that conserves time, fuel, and/or component wear (e.g., tire tread), while also accommodating operational limitations of excavation machine 10. In particular, during completion of the truck loading cycle, excavation machine 10 must first drive into pile 24 at a particular dig location 22, fill work tool 20 with material, and then back out along a first travel segment 46 to a pivot point 48. At pivot point 48, the operator of excavation machine 10 must shift gears, and resume travel in a forward direction along a second travel segment 50 that leads to dump location 24 over haul truck 12. And during travel along segments 46 and 50, the operator must raise work tool 20 from a dig height to a dump height over haul truck 12 (e.t., to a height greater than a bed height of haul truck 12). In order to reduce an amount of time required to perform this cycle (and also to reduce an amount of consumed fuel and tire tread wear), haul truck 12 should be located just far enough away from pivot point 48 to allow time sufficient for work tool 20 to be raised to the dump height. In the disclosed embodiment, this time corresponds with machine travel along segment 46 for about 1.5-2 rotations of traction device 28, and travel along segment 50 for about the same distance. In addition, steering limitations of excavation machine 10 may require first and second segments 46, 50 to be separated by an interior angle α. In the disclosed embodiment, α may be about 30-60° (e.g., about 45°).

Figure 2:
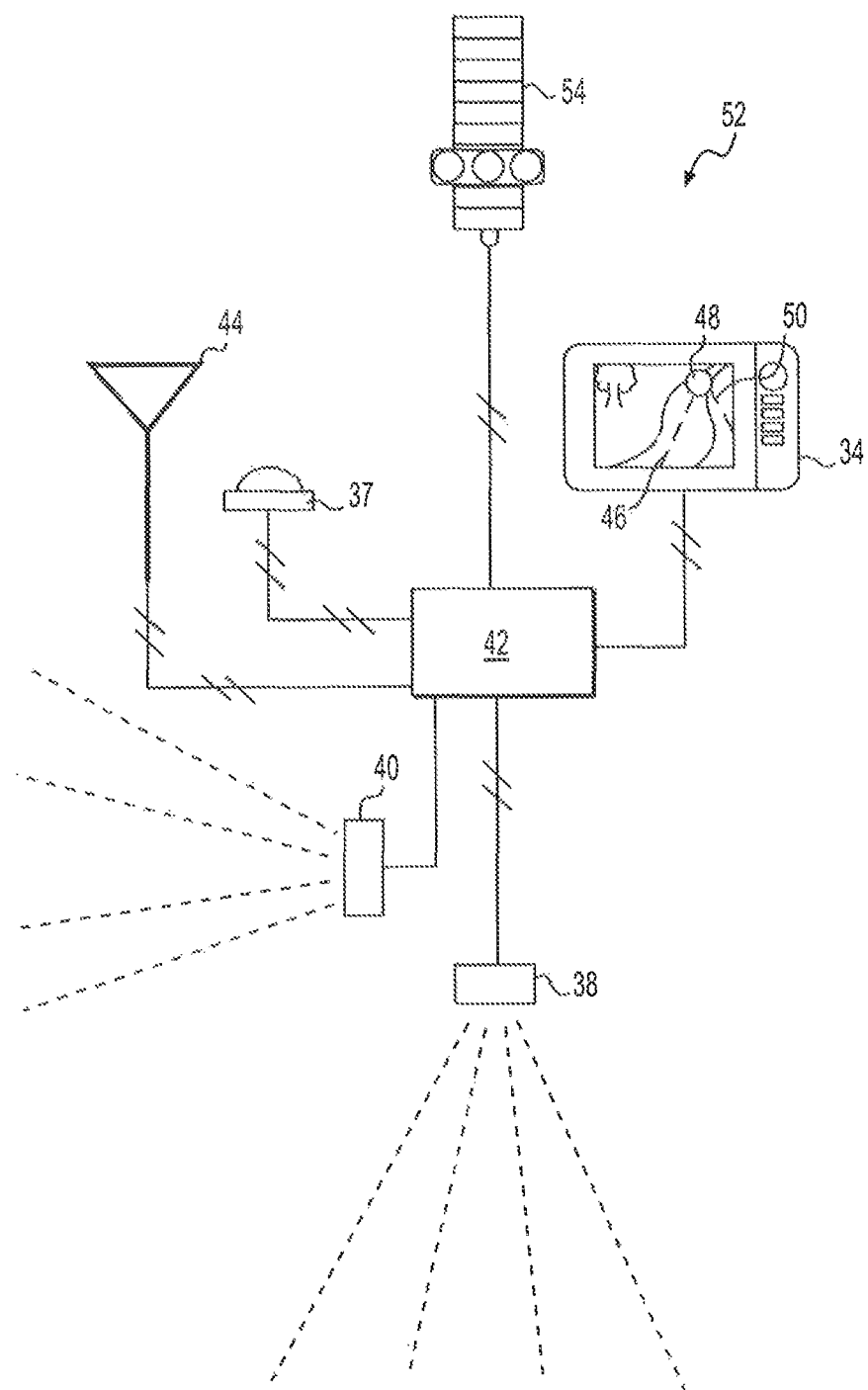
FIG. 2 is a diagrammatic illustration of an excavation system that may be used in conjunction with the mobile machine of FIG. 1.

FIG. 2 illustrates an excavation system 52 that is configured to automatically determine the location of pivot point 48, and the corresponding travel path (i.e., first and second segments 46, 50) between dig and dump locations 22, 26 that passes through pivot point 48. Excavation system 52 may include, among other things, interface device 34, locating device 37, backup camera 38, sensor 40, controller 42, communication device 44, and a load sensor 54. Controller 42 may be in communication with each of the other components of excavation system 52 and, as will be explained in more detail below, configured to determine and display the travel path inside operator station 18 for use by the operator in controlling excavation machine 10.

Controller 42 may embody a single microprocessor or multiple microprocessors that include a means for monitoring the location of excavation machine 10, communicating with haul truck 12, determining the travel path, and displaying information regarding the travel path within operator station 18. For example, controller 42 may include a memory, a secondary storage device, a clock, and a processor, such as a central processing unit or any other means for accomplishing a task consistent with the present disclosure. Numerous commercially available microprocessors can be configured to perform the functions of controller 42. It should be appreciated that controller 42 could readily embody a general machine controller capable of controlling numerous other machine functions. Various other known circuits may be associated with controller 42, including signal-conditioning circuitry, communication circuitry, and other appropriate circuitry. Controller 42 may be further communicatively coupled with an external computer system, instead of or in addition to including a computer system, as desired.

Load sensor 54 may be any type of sensor known in the art that is capable of generating a load signal indicative of a status of work tool 20. For example, load sensor 54 may be a pressure sensor associated with the lift cylinder of hydraulic actuators 32. When load sensor 54 is embodied as a pressure sensor, the load signal may correspond with a pressure of hydraulic fluid inside the lift cylinder, and controller 42 may use this signal as a direct measurement of an amount of material contained within work tool 20. In another example, load sensor 54 could be associated with powertrain 16 (e.g., with the engine and/or transmission of powertrain 16). In this example, the load signal may alternatively correspond with a speed and/or torque output of power train 16, and controller 42 may use this signal as an indirect measurement of the amount of material being moved by work tool 20. In yet another example, load sensor 54 could be a scanner or camera configured to generate or capture a 3D representation of a volume inside work tool 20 displaced by the material (or of an unfilled volume remaining). In this final example, the 3D representation may be correlated to the amount of material being moved by work tool 20. Other load sensor configurations may also be possible.

INDUSTRIAL APPLICABILITY

The disclosed excavation system finds potential application within any mobile machine at any worksite where it is desirable to assist the operator in determining efficient travel paths. The excavation system finds particular application with an articulated wheel loader, where steering of the wheel loader during completion of a truck loading cycle can be difficult to execute properly. The excavation system may assist the operator by determining a travel path that accommodates machine limitations and reduces travel time, fuel consumption, and tread wear. The excavation system may then display the travel path inside the machine, allowing the operator to follow the path. In addition, the excavation system may provide feedback regarding how well the path is being followed and/or assist the operator by autonomously controlling particular machine functions during the travel. Operation of excavation system 52 will now be described in detail.

During performance of the truck loading cycle, controller 42 may continuously monitor the status of work tool 20 and the position of excavation machine 10. In particular, controller 42 may evaluate the load signal from sensor 54 to determine when work tool 20 is sufficiently loaded with material (i.e., loaded with an amount of material greater than a threshold amount). And in response to work tool 20 being sufficiently loaded, controller 42 may determine what the position of excavation machine 10 is at that time. Controller 42 may then determine the position of haul truck 12 (e.g., directly via sensor 40 or indirectly via communication device 44), and calculate the location of pivot point 48 based on these input and known kinematics of excavation machine 10. For example, controller 42 may determine the locations, orientations, and trajectories of first and second segments 46 and 50 such that a length of these segments is at about equal to 1.5-2 times a circumference of traction device 28 and such that these segments are separated by angle α of about 45°. This travel path should allow the operator to raise work tool 20 to a height above haul truck 12 just before excavation machine 10 reaches haul truck 12 (with little or no pause in the travel of excavation machine 10), and allow space between the segments that is required for articulated steering of machine 10.

Controller 42 may then direct the operator to follow the travel path. In particular, controller 42 may overlay the travel path on images generated by backup camera 38. This may include first segment 46, pivot point 48, and second segment 50. In some embodiments, only first segment 46 and pivot point 48 may be shown, as the location, orientation, and trajectory of second segment 50 should become obvious to the operator after reaching pivot point 48. That is, second segment 50 should extend from pivot point 48 to dump location 26 over haul truck 12 and, once at pivot point 48, the operator may need only to drive toward haul truck 12. When displaying the travel path on interface device 34, controller 42 may show a center line of the travel path, side boundaries of the path, directional arrows, stop points, symbols, or any other visual representations that may be helpful to the operator.

In some embodiments, controller 42 may additionally provide feedback regarding how well the operator is following the travel path shown on interface device 34. For example, controller 42 may be configured to produce visual indications (e.g., flashing boundary lines), audible indications (e.g., warning alarms and/or instructions), and/or tactile feedback (e.g., vibrations within interface device 34 such as in a steering joystick or wheel). The operator may then correct the machine's course to better match the travel path shown on interface device 34.

It is contemplated that controller 42 may also be configured to complete portions of the truck loading cycle autonomously, such that the operator may focus more intently on steering of excavation machine 10 along the travel path. For example, upon sensing that work tool 20 is filled with material beyond the threshold amount, controller 42 could cause work tool 20 to automatically be raised to the height required for dumping into haul truck 12. This may be accomplished via communication of controller 42 with the lift cylinders of hydraulic actuators 32 (e.g., with valves of the cylinders that control fluid flow into and out of the lift cylinders). In this way, the operator may be assured that work tool 20 will be at the correct height above haul truck 12 for dumping when excavation machine 10 reaches haul truck 12, and the operator may not be distracted thereby when steering excavation machine 10 along travel segments 46 and 50.

The disclosed excavation system may improve machine productivity, reduce fuel consumption, and reduce component wear, even when the dig and dump locations are constantly changing. In particular, the disclosed system may continuously determine the shortest route that must be traveled by excavation machine 10, while also accommodating known machine limitations. By following the shortest route, the time and fuel required to complete each cycle may be reduced. In addition, by accommodating the known limitations of excavation machine 10, the operator may not need to control excavation machine 10 in a manner that prematurely wears machine components. In addition, by training the operator to follow the desired travel path, as opposed to autonomously controlling excavation machine 10 to follow the path, excavation system 52 may be kept simple and inexpensive, with broad applicability to any existing or new manned machine.

It will be apparent to those skilled in the art that various modifications and variations can be made to the excavation system of the present disclosure. Other embodiments will be apparent to those skilled in the art from consideration of the specification and practice of the excavation system disclosed herein. It is intended that the specification and examples be considered as exemplary only, with a true scope being indicated by the following claims and their equivalents.

What is claimed is:

1. An excavation system for use at a worksite having a haul truck and an excavation machine with a work tool, the excavation system comprising:
   a locating device configured to generate a position signal indicative of a position of the excavation machine;
   a sensor configured to generate a load signal indicative of a status of the work tool; and
   a controller in communication with the locating device and the sensor, the controller being configured to:
   determine a location of the haul truck;
   determine, based on the load signal, when the work tool of the excavation machine is filled with at least a threshold amount of material from a pile at the worksite;
   in response to the work tool being filled with at least the threshold amount of material, determine the position of the excavation machine based on the position signal, said position defining a first end of a first travel segment;
   determine a second end of said first travel segment, said second end being about 1.5-2.0 rotations of a traction device associated with the excavation machine away from the first end;
   determine a second travel segment between said second end of said first travel segment and the location of the haul truck, the intersection between said first travel segment and said second travel segment defining a pivot point having an interior angle between about 30-60 degrees;
   plan a travel path for the excavation machine to the haul truck through the pivot point; and
   direct, via an interface device, an operator of the excavation machine to follow the travel path.

2. The excavation system of claim 1, wherein the location of the haul truck is communicated to the excavation machine.

3. The excavation system of claim 1, further including a scanner located on the excavation machine and configured to detect the location of the haul truck.

4. The excavation system of claim 1, wherein the controller is further configured to:
communicate a desired loading location to the haul truck; and
the location of the haul truck is assumed to be the desired loading location.

5. The excavation system of claim 1, wherein the sensor is a pressure sensor associated with a hydraulic actuator connected to the work tool and configured to directly sense a load of material in the work tool.

6. The excavation system of claim 1, wherein the sensor is associated with a powertrain of the excavation machine and configured to indirectly sense a load of material in the work tool.

7. A method of controlling an excavation machine at a worksite, comprising:
determining a location of a haul truck;
determining when a work tool of the excavation machine is filled with at least a threshold amount of material from a pile at the worksite;
in response to the work tool being filled with at least the threshold amount of material, determining a position of the excavation machine, said position defining a first end of a first travel segment;
determining a second end of said first travel segment, said second end being about 1.5-2.0 rotations of a traction device associated with the excavation machine away from the first end;
determining a second travel segment between said second end of said first travel segment and the location of the haul truck and the position of the excavation machine at a time the work tool is filled with at least the threshold amount of material, the intersection between said first travel segment and said second travel segment defining a pivot point having an interior angle between about 30-60 degrees;
planning a travel path for the excavation machine to the haul truck through the pivot point; and
directing, via an interface device, an operator of the excavation machine to follow the travel path.

8. The method of claim 7, wherein directing the operator of the excavation machine to follow the travel path includes showing the first and second travel segments on an interface device inside the excavation machine overlapped with images of an area of the worksite behind the excavation machine.

9. The excavation system of claim 1, wherein the controller is configured to show the first and second travel segments on the interface device.

10. The excavation system of claim 9, further including a backup camera configured to capture images of an area of the worksite behind the excavation machine, wherein the first and second travel segments are shown overlapping the images on the display.

11. The excavation system of claim 10, wherein the controller is further configured to provide feedback to the operator regarding how well the operator is manually controlling the excavation machine to follow the travel path.

12. The excavation system of claim 11, wherein the feedback is tactile feedback.

13. The excavation system of claim 11, wherein the controller is further configured to automatically move the work tool while the operator is manually controlling the excavation machine to follow the travel path.

14. An excavation machine, comprising:
a frame;
a plurality of wheels rotatably connected to the frame and configured to support the frame;
a powertrain mounted to the frame and configured to drive the plurality of wheels;
a work tool;
at least one hydraulic actuator connected between the work tool and the frame;
a locating device configured to generate a position signal indicative of a position of the excavation machine at a worksite;
a sensor configured to generate a load signal indicative of a status of the work tool;
a backup camera configured to generate images of an area behind the excavation machine;
an operator station connected to the frame;
interface device located inside the operator station; and
a controller in communication with the locating device, the sensor, the backup camera, and the interface device, the controller being configured to:
receive a location signal from offboard the excavation machine that is indicative of a location of a haul truck;
determine, based on the load signal, when the work tool of the excavation machine is filled with at least a threshold amount of material from a pile at the worksite;
in response to the work tool being filled with at least the threshold amount of material, determine the position of the excavation machine based on the position signal, said position defining a first end of a first travel segment;
determine a second end of said first travel segment, said second end being about 1.5-2.0 rotations of said wheels away from the first end;
determine a second travel segment between said second end of said first travel segment and the location of the haul truck, the intersection between said first travel segment and said second travel segment defining a pivot point having an interior angle between about 30-60 degrees;
plan a travel path for the excavation machine to the haul truck through the pivot point; and
show the travel path on the interface device overlapped with the images generated by the backup camera.

* * * * *